United States Patent [19]

Banks et al.

[11] Patent Number: 4,640,753
[45] Date of Patent: Feb. 3, 1987

[54] METHOD OF ELECTROCOATING METALLIC SURFACES

[75] Inventors: Christopher P. Banks, Saffron Walden; Edward Irving, Burwell, both of England

[73] Assignee: Ciba-Geigy Corporation, Ardsley, N.Y.

[21] Appl. No.: 746,429

[22] Filed: Jun. 19, 1985

[30] Foreign Application Priority Data

Jun. 27, 1984 [GB] United Kingdom ............... 8416389

[51] Int. Cl.$^4$ .................. C25D 13/06; C09D 3/58
[52] U.S. Cl. ............................ 204/181.7; 204/181.4
[58] Field of Search ...................... 204/181.6, 181.4

[56] References Cited

U.S. PATENT DOCUMENTS

| | | | |
|---|---|---|---|
| 3,573,180 | 3/1971 | Hodes et al. | 204/72 |
| 4,038,232 | 7/1977 | Bosso et al. | 204/181.7 |
| 4,040,924 | 8/1977 | Jones | 204/181.7 |
| 4,416,752 | 11/1983 | Crivello | 204/181.7 |

FOREIGN PATENT DOCUMENTS

| | | | |
|---|---|---|---|
| 0084244 | 7/1983 | European Pat. Off. | 204/72 |
| 106352 | 4/1984 | European Pat. Off. | 204/181.6 |
| 1330212 | 9/1973 | United Kingdom | 204/181.7 |
| 1359361 | 7/1974 | United Kingdom | 204/59 |

OTHER PUBLICATIONS

U. Akbulat et al, Makromol. Chem., 4, 259, (1983).
U. Akbulat et al, Brit. Polymer J., 15, 179, (1983).
A. M. Onal et al, Brit. Polymer J., 15, 187, (1983).
U. Akbulut et al, J. Polymer Sci., Poly. Chem., 13, 133, (1975).
Encyclopedia Polymer Sci. & Tech., vol. 5, pp. 629–641.

*Primary Examiner*—Howard S. Williams
*Attorney, Agent, or Firm*—Luther A. R. Hall

[57] ABSTRACT

Metallic surfaces, especially of ferrous metals, are coated by passing an electric current at a voltage of at least 15 V between the metallic surface as anode and a cathode in contact with a composition comprising
(A) an epoxide resin, and
(B) a salt of formula $$[A^{y+}][Z^-]_y$$

where
$A^{y+}$ denotes a cation which is a metal, a metal complex an organometallic, a heterocycle, a sulphoxonium, ammonium, a substituted ammonium or a phosphonium ion,
y denotes 1, 2, or 3,
$Z^-$ denotes an anion selected from perchlorate, trifluoromethane sulphonate pentafluorohydroxoantimonate, and the complex anions of formula $MQ_d^-$,
M represents a boron, phosphorus, antimony or arsenic atom
Q represents a halogen atom, and
d is 4 or 6 and is one more than the valency of M, whereby polymerized epoxide resin is deposited on the metallic surface.

Typical salts (B) include sodium, potassium, magnesium, ammonium, substituted phosphonium and substituted ammonium trifluoromethane sulphonates, perchlorates, tetrafluoroborates, hexafluorophosphates, hexafluoroarsenates, and hexafluoroantimonates.

16 Claims, No Drawings

METHOD OF ELECTROCOATING METALLIC SURFACES

This invention relates to a method of coating metallic surfaces by electrolytic polymerization of a cationically polymerisable epoxide resin on the surfaces in the presence of a salt.

Metallic surfaces have previously been coated by means of cationically polymerisable materials in the presence of salts that decompose electrolytically. In U.S. Pat. No. 4 416 752, for example, there is claimed a coating method in which a metal substrate or a metallised non-conducting substrate is used as the anode in an electrolysed mixture of a cationically polymerisable organic material and an aryliodonium or arylsulphonium salt having an anion $MQ_d$, where M is a metal or metalloid selected from boron, phosphorus, antimony and arsenic, Q is a halogen, and d is 4–6. Suitable cationically polymerisable materials include mono- and poly-epoxides, vinyl compounds, cyclic ethers, cyclic esters, and their mixtures. The advantage of this process, compared with prior art polymer electrodeposition processes, is that the polymerisable materials themselves do not need to be specially formulated to make them electrodepositable.

Aryliodonium and arylsulphonium salts as described in this United States patent suffer from two drawbacks. Firstly, they are photosensitive, so that mixtures of cationically-polymerisable material and such salts have only a limited storage life unless kept in total darkness. Electrocoating baths containing these mixtures would need to be used under carefully controlled lighting conditions if premature gelation is to be avoided. The second drawback is that they are difficult to prepare and therefore expensive, so that large scale utilisation of the claimed coating process is not commerically feasible at the present time.

The use of a quaternary ammonium hexafluorophosphate or tetrafluoroborate as electrolyte for the electroinitiated cationic polymerisation of various epoxides is also known and is described by U. Akbulut et al., Makromol. Chem., Rapid Commun. 4, 259–261 (1983), U. Akbulut et al., British Polymer Journal, 15, 179–182 (1983), and A. M. Onal et al., British Polymer Journal, 15, 187–189 (1983). These papers describe the polymerisation of epoxycyclohexane, 1,2-epoxy-4-epoxyethyl cyclohexane, epoxycyclopentane, and epoxystyrene by constant potential electrolysis at a voltage of up to 3 volts over a period of about 1½ hours. The voltages were kept low in order to prevent the electrolyte salt from entering into the reaction. An earlier paper on the polymerisation of styrene by U. Akbulut et al., J. Polymer Science: Polymer Chem. Ed., 13, 133–149 (1975) had shown that $BF_4^{31}$ was oxidised in the region of +2.5 to +3.0 V, and so at voltages above this, cationic polymerisation involved the formation of an initiator or an intermediate radical by oxidation of the anion of the electrolyte. Since the object of the later papers was to compare the polymer obtained by electroinitiated polymerisation with that obtained by gamma radiation induced polymerisation, it was important that products formed by reaction of intermediate radicals were minimised, and so low voltages were used throughout. At these low voltages polymerisation was too slow to be of practical use, and no indication is given in these articles of any practical use for the process.

The electrolytic polymerisation of certain epoxides onto carbon fibre is described in European Patent Publication No. 0 106 352. In this publication a reactive monomer, which term includes aliphatic and alicyclic epoxides, is mixed with an electrolyte in a solvent, and is polymerised onto the surface of carbon fibre rovings when a DC voltage of 5–25 volts is applied. Suitable electrolytes include alkali metal and ammonium halides, sulphates, nitrates, perchlorates, sulphonates, carboxylates and tetrafluoroborates.

It is stated that electrolytic polymerisation of a reactive monomer onto a metal electrode is known, but there is little possiblity of putting the process to practical use because of the low polymerisation activity of the monomer and the limited amount of the monomer deposited on the metal. There is stated to be an interaction between the carbon fibre surface and the polymer which is stronger than the physical interaction in the case of simple van der Waals adsorption, but this interaction is not the result of simple curing of the resin since it is also stated that if there is marked thermal polymerisation the cohesive strength and uniformity of the composition is impaired. This publication therefore described a method of coating carbon fibres so that there is interaction between fibre and coating, making the fibre more suitable for use in the preparation of carbon fibre composites. It does not describe the application of a fully cured coating, nor does it describe a method having general applicability to a variety of substrates.

It has now been found that by using certain specific salts and a voltage of at least 15 volts, it is possible to electrodeposit an epoxide resin in a cured, or at least partially cured state onto a metallic surface without any of the drawbacks of the prior art methods. It is believed, although the utility of this invention does not depend upon the accuracy of this belief, that the passage of the current causes the salt to form a reactive species on the metallic surface which is active as an anode, this reactive species being a curing agent for the epoxide resin. Contact of the epoxide resin, which need not be intrinsically electrodepositable, with the reactive species on the surface of the anode, causes a build-up of epoxide resin. This build up of cured, or at least partially cured epoxide resin on the anode forms rapidly, usually within a matter of a few seconds. The method therefore gives a simple but rapid method of coating metallic surfaces with epoxide resin that has not been indicated previously. The salts used are easily prepared and are mostly not photosensitive. These salts may be metallic, including organometallic and complexed metallic, heterocyclic, ammonium, sulphoxonium, substituted ammonium and phosphonium salts with anions that liberate a reactive species at the anode when a potential of at least 15 volts is applied.

Accordingly this invention provides a method of coating a metallic surface which comprises passing an electric current at a voltage of at least 15 volts between the metallic surface as anode and a cathode in contact with a composition comprising (A) an epoxide resin, and
(B) a salt of formula $$[A^{y+}] [Z^-]_y \qquad \text{I}$$

where $A^{y+}$ denotes a cation which is a metal, a metal complex, an organometallic, a heterocycle, ammonium, a sulphoxonium, a substituted ammonium, or a phosphonium ion, y denotes 1, 2, or 3, and $Z^-$ denotes an anion selected from perchlorate, trifluoromethane sulphonate, pentafluorohydroxoantimonate, and the complex anions of formula $MQ_d^-$, M represents an atom of a metal or metalliod selected from boron, phosphorus, antimony and arsenic, Q represents a halogen atom, and d is 4 or 6 and is one more than the valency of M, whereby polymerised epoxide resin is deposited on the metallic surface.

The method of the invention is particularly suitable for use in the coating of ferrous metals, like steel for example, in order to prevent corrosion.

Suitable cations $A^{y+}$ are those of metals, especially alkali or alkaline earth metals, such as sodium, potassium, magnesium or calcium, ammonium, substituted phosphonium of formula

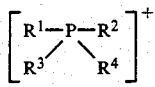

II and substituted ammonium of formula

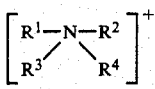

III where $R^1$, $R^2$, $R^3$ and $R^4$, which may be the same or different, represent alkyl, alkenyl, aryl, aralkyl, cycloalkyl, or cycloalkylalkyl groups which may be substituted or $R^1$ and $R^2$, and/or $R^3$ and $R^4$, together with the nitrogen or phosphorus atom to which they are attached, form a heterocyclic ring which may contain one or more additonal hetero atoms.

Other suitable cations $A_{y+}$ include aliphatic sulphoxonium cations, such as trimethylsulphoxonium, and acetylmethyldimethylsulphoxonium, heterocyclics, such as 2,4,6-alkyl or aryl pyrylium cations, complexed metal cations such as transition metal ammonium or amine complex cations, and organometallic cations such as $\eta^5$-cyclopentadienyltricarbonyl, $\eta^6$-arene tricarbonly, $\eta^7$-cycloheptatrienyl tricarbonyl, bis($\eta^5$-cyclopentadienyl), bis($\eta^6$-arene), and ($\eta^6$-arene) ($\eta^5$-cyclopentadienyl) transition metal cations.

Preferred salts used in the process of this invention are sodium, potassium, magnesium, $\eta^6$-arenetricabonyl and ($\eta^6$-arene) ($\eta^5$-cyclopentadienyl) iron, manganese, cobalt, chromium, tungsten, and molybdenum salts, ammonium, and substituted phosphonium and ammonium salts of formulea II and III in which $R^1$, $R^2$, $R^3$ and $R^4$ represent the same or different unsubstituted alkyl groups of up to 6 carbon atoms, aralkyl groups of from 7 to 10 carbon atoms, or aryl groups of 6 to 10 carbon atoms, having anions that are trifluoromethanesulphonate, perchlorate, tetrafluoroborate, hexafluorophosphate, hexafluoroarsenate or hexafluoroantimonate ions.

The epoxide resin is a compound having more than one 1,2-epoxide group per molecule. Preferably this resin is a cycloaliphatic epoxide resin such as 3,4-epoxycyclohexylmethyl 3+,4'-epoxycyclohexanecarboxylate or its 6,6'-dimethyl derivative, ethylene glycol bis(3,4-epoxycyclohexanecarboxylate), bis(3,4-epoxycyclohexylmethyl)adipate, dicyclopentadiene dioxide or vinylcyclohexene dioxide, a polyglycidyl ether, which may have been advanced, of a polyhydric alcohol such as 1,4-butanediol or diethylene glycol, or a polyhydric phenol such as 2,2-bis(4-hydroxyphenyl)-propane or a phenol-aldehyde novolak, or a polyglycidyl ester of a polycarboxylic acid such as phthalic, tetrahydrophthalic, trimellitic or pyromellitic acid.

The process of the invention is conveniently effected by mixing the epoxide resin with the salt in an organic or aqueous organic solvent, inserting a metallic surface as the anode and an inert metal as the cathode, and passing a current until a suitable thickness of polymerised resin has been deposited on the anode. This is then removed from the bath and dried, usually at elevated temperature. By reversing the current, or by using an alternating current, polymerised resin can be deposited on both electrodes. The amount of the salt used may vary between fairly wide limits but is normally 0.1% to 10% based on the weight of epoxide resin. The concentration of epoxide resin in the solution is usually from 5% to 50% by weight. The solution is preferably at ambient temperature, but it may be heated or cooled if desired, temperatures within the range of 0° C. to 80° C. having been found to be satisfactory. Suitable solvents for this process include ketones, such as acetone, methyl ethyl ketone and methyl isobutyl ketone, halogenated hydrocarbons such as dichloromethane, chloroform and tetrachloroethane, nitro compounds such as nitromethane, nitroethane and nitrobenzene, and their mixtures. Voltages used are above 15 V, usually within the range 15 V to 150 V, especially 30 V to 100 V, and the current required to effect a deposite that is from about 1 to about 30 micrometers thick is usually within the range 10 mA to 10 A.

This invention will now be illustrated by reference to the following Examples in which all parts are by weight.

EXAMPLE 1

2,2-Bis(4-glycidyloxyphenyl)propane (1 part; epoxide content 5.2 equivalents/kg) and potassium hexafluorophosphate (0.01 part) are dissolved in a mixture of dichloromethane (1 part) and acetone (1 part). An anode and a cathode, both of tinplate (tin-plated steel sheet), are inserted into the solution and a current is passed for 2 seconds at 30 volts. The anode is removed from the bath and dried at 90° for 5 minutes. The coating on the anode is 13 micrometers thick and is hard and tack-free.

When the experiment is repeated but with no current passing, a tacky, uncured deposit forms on the tinplate. Similarly, when the experiment is repeated with the current passing out without the potassium salt, a tacky, uncured deposit forms on the tinplate.

EXAMPLE 2

Example 1 is repeated, replacing the potassium salt by an equal weight of sodium tetrafluoroborate and adding water (0.1 part) to the solvent mixture. A current is passed for 30 seconds at 30 volts, giving a hard, tack-free coating 13 micrometers thick.

When this experiment is repeated, but with no current passing, a tacky, uncured deposit forms on the tinplate.

EXAMPLE 3

Example 1 is repeated, replacing the potassium salt by an equal weight of tetramethylammonium hexafluorophosphate. The current is passed for 10 seconds and gives a tack-free hard coating 8 micrometers thick, after drying at 90° C. for 5 minutes.

Repetition of this experiment with no current flowing gives only a tacky, uncured deposit.

EXAMPLE 4

Example 1 is repeated, replacing the potassium salt by an equal weight of potassium hexafluoroarsenate. The current is passed for 10 seconds and gives a tack-free, hard coating 7 micrometers thick, after drying at 90° C. for 5 minutes.

Repetition of this experiment with no current flowing gives only a tacky, uncured deposit.

EXAMPLE 5

3,4-Epoxycyclohexylmethyl 3',4'-epoxycyclohexane carboxylate (1 part) and tetramethylammonium tetrafluoroborate (0.02 part) are dissolved in a mixture of dichloromethane (1 part) and acetone (1 part). An anode and a cathode, both of tinplate, are inserted into the solution and a current is passed for 30 seconds at 30 volts. The anode is removed from the bath and dried at 90° C. for 5 minutes. The coating on the anode is 25 micrometers thick and is hard and tack-free. Repetition of this experiment with no current flowing gives only a tacky, uncured deposit, as does repetition with the current flowing but in the absence of the tetramethylammonium salt.

EXAMPLE 6

An epoxidised novolak prepared from a phenolformaldehyde novolak where the starting P:F ratio is 1.75:1 (1 part, epoxide content=5.5 equivalents/kg) and tetramethylammonium hexafluoroantimonate (0.02 part) are dissolved in a mixture of methyl isobutyl ketone (3 parts) and acetone (0.5 part). An anode and a cathode, both of tinplate, are inserted into the solution and a current is passed for 30 seconds at 30 volts. The anode is removed from the bath and dried at 90° C. for 5 minutes. The coating on the anode is 5 micrometers thick and is hard and tack-free.

Repetition of this experiment with no current flowing gives only a tacky, uncured deposit.

EXAMPLE 7

2,2-Bis(4glycidyloxphenyl)propane (1 part; epoxide content 5.2 equivalents/kg) and potassium perchlorate (0.03 part) are dissolved in a mixture of acetone (2.5 parts) and water (0.5 part). An anode and a cathode, both tinplate, are inserted into the solution and a current is passed for 30 seconds at 30 volts. The anode is removed from the bath and dried at 90° C. for 5 minutes. The coating on the anode is 10 micrometers thick and is hard and tack-free.

Repetition of this experiment with no current flowing gives only a tacky, uncured deposit.

EXAMPLE 8

3,4-Epoxy cyclohexylmethyl 3',4'-epoxycyclohexane carboxylate (1 part) and ammonium tetrafluoroborate (0.1 part) are dissolved in a mixture of acetone (2 parts), dichloromethane (1 part) and water (0.5 part). An anode and a cathode, both of tinplate, are inserted into the solution and a current is passed for 2 seconds at 50 volts. The anode is removed from the bath and dried at 90° C. for 5 minutes. The coating on the anode is 8 micrometers thick and is hard and tack-free.

Repetition of this experiment with no current flowing gives only a tacky, uncured deposit.

EXAMPLE 9

2,2-Bis(4-glycidyloxyphenyl) propane (1 part) and ($\eta^6$-toluene) tricarbonylmanganese hexafluorophosphate (0.01 part) are dissolved in a mixture of dichloromethane (1 part) and acetone (1 part). A current is passed as described in Example 1 for 30 seconds at 30 volts. The anode is removed, washed, and dried for 5 minutes at 90° C. and has a tack-free deposit 13 micrometers in thickness.

EXAMPLE 10

2,2-Bis(4-glycidyloxyphenyl)propane (1 part) and ($\eta^6$pyrene) ($\eta^5$-cyclopentadienyl)iron (II) hexafluorophosphate (0.01 part) are dissolved in a mixture of dichloromethane (1 part) and acetone (1 part). The resin is electrodeposited onto a tinplate anode, as described in Example 1, the current passing for 5 seconds at 30 volts. The anode is removed and dried for 5 minutes at 90° C. and has a tack-free deposit 8 micrometers thick.

EXAMPLE 11

2,2-Bis(4-glycidyloxyphenyl)propane (1 part) and trimethylsulphoxonium tetrafluoroborate (0.01 part) are dissolved in dichloromethane (1 part) and acetone (1 part). The resin is deposited onto a tinplate anode, as described in Example 1, the current passing for 60 seconds at 30 volts. The anode is removed and dried for 5 minutes at 90° C. and has a tack-free deposit 11 micrometers thick.

EXAMPLE 12

1,4-Butanediol diglycidylether (1 part) and trimethylsulphoxonium hexafluorophosphate (0.01 part) are dissolved in a mixture of 2-butoxyethanol (0.5 part) and water (1.5 parts). The resin is electrodeposited onto a tinplate anode as described in Example 1, the current passing for 120 seconds at 50 volts. The anode is removed and dried at 90° C. for 10 minutes. The resultant coating is hard and tack-free and is 19 micrometers thick.

EXAMPLE 13

2,2-Bis( 4-glycidyloxphenyl)propane (1 part) and trimethylsulphoxonium hexafluorophosphate (0.03 part) are dissolved in a mixture of dichloromethane (1 part) and acetone (1 part). The resin is electrodeposited onto a copper-clad laminate anode, using a tinplate cathode, the current passing for 30 seconds at 30 volts. When the anode is removed from the bath and dried for 5 minutes at 90° C., it is found to have a tack-free coating 11 micrometers thick.

EXAMPLE 14

Example 8 is repeated, replacing the ammonium tetrafluoroborate by trimethylsulphoxonium hexafluorophosphate (0.03 part) and passing the current for 2 seconds at 100 volts. The resultant tack-free deposit is 25 micrometers thick.

EXAMPLE 15

Example 8 is repeated, replacing the ammonium tetrafluoroborate by 2,4,6-trimethyl pyrylium perchlorate (0.03 part) and passing the current for 30 seconds at 30 volts. The resultant tack-free deposit is 10 micrometers thick.

EXAMPLE 16

Example 13 is repeated, replacing the hexafluorophosphate by trimethylsulphoxonium hexafluoroantimonate (0.01 part). The resin is deposited onto a tinplate anode for 2 seconds at 100 volts. The resultant, hard, tack-free deposit is 15 micrometers thick.

EXAMPLE 17

3,4-Epoxycyclohexylmethyl 3',4'-epoxycyclohexane carboxylate (1 part) and magnesium trifluoromethane sulphonate (0.2 part) are dissolved in a mixture of acetone (2 parts) and water (0.5 part). An anode and a cathode, both of tinplate, are inserted into the solution and a current is passed for 10 seconds at 30 volts. The anode is removed from the bath and dried at 90° C. for 5 minutes. The coating on the anode is 6 micrometers thick and is hard and tack-free.

Repetition of this experiment with no current flowing gives only a tacky, uncured deposit.

EXAMPLE 18

Example 1 is repeated, replacing the anode used in that Example by anodes of steel, aluminium, and copper. In all cases passage of an electric current at 30 volts for 2 seconds, followed by drying as described, gives a hard, tack-free coating on the metal. When the experiments are repeated, but with no current flowing, tacky deposits only are obtained.

What is claimed is:

1. A method of coating a metallic surface which comprises passing an electric current at a voltage of at least 15 volts between the metallic surface as anode and a cathode in contact with a composition comprising
  (A) an epoxide resin, and
  (B) a salt of formula $$[A^{y+}] [Z^-]_y \qquad \text{I}$$

where
$A^{y+}$ denotes a cation which is a metal, a metal complex, an organometallic, a heterocycle, ammonium, a sulfoxonium, a substituted ammonium, or a phosphonium ion,
y denotes 1, 2, or 3,
$Z^-$ denotes an anion selected from perchlorate, trifluoromethane sulfonate, pentafluorohydroxyantimonate and complex anions of formula $MQ_d^-$,
M represents an atom of a metal or metalloid selected from boron, phosphorus, antimony and arsenic,
Q represents a halogen atom, and
d is 4 to 6 and is one more than the valency of M, whereby polymerized epoxide resin is deposited on the metallic surface.

2. A method as claimed in claim 1 wherein the metallic surface is that of a ferrous metal.

3. A method as claimed in claim 1, wherein the cation $A^{y+}$ is that of a metal, ammonium, substituted phosphonium of formula

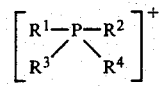

or substituted ammonium of formula

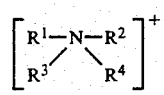

where
$R^1$, $R^2$, $R^3$ and $R^4$, which may be the same or different, represent alkyl, alkenyl, aryl, aralkyl, cycloalkyl or cycloakylalkyl groups or $R^1$ and $R^2$, and/or $R^3$ and $R^4$, together with the nitrogen or phosphorus atom to which they are attached, form a heterocyclic ring.

4. A method as claimed in claim 3 in which the salt is a sodium, potassium, magnesium, ammonium, or substituted phosphonium or ammonium salt of formula II or III in which $R^1$, $R^2$, $R^3$ and $R^4$ represents the same or different unsubstituted alkyl groups of up to 6 carbon atoms, aralkyl groups of from 7 to 10 carbon atoms, or aryl groups of 6 to 10 carbon atoms, having an anion that is a trifluoromethane sulfonate, perchlorate, tetrafluoroborate, hexafluorophosphate, hexafluoroarsenate, or hexafluoroantimonate ion.

5. A method as claimed in claim 1 wherein the cation $A_{y+}$ is an aliphatic sulphoxonium, a heterocycle, a complexed metal or an organometallic cation.

6. A method as claimed in claim 5 wherein the cation $A^{y+}$ is trimethylsulfoxonium, acetylmethyldimethylsulfoxonium, 2,4,6-alkyl or aryl pyrylium, transition metal ammonium or amine complex, or a $\eta^5$-cyclopentadienyl tricarbonyl, $\eta^6$-arene tricarbonyl, $\eta^7$-cycloheptatrienyl tricarbonyl, bis($\eta^5$-cyclopentadienyl), bis($\eta^6$-arene) or ($\eta^6$-arene) ($\eta^5$-cyclopentadienyl) transistion metal cation.

7. A method as claimed in claim 6 wherein the cation $A^{y+}$ is $\eta^6$-arenetricarbonyl or ($\eta^6$-arene) ($\eta^5$-cyclopentadienyl)iron, manganese, cobalt, chromium, tungsten, or molybdenum, and the anion is a trifluoromethane sulfonate, perchlorate, tetrafluoroborate, hexafluorophosphate, hexafluoroarsenate, or hexafluoroantimonate ion.

8. A method as claimed in claim 1 in which the salt is potassium hexafluorophosphate, hexafluoroarsenate or perchlorate; sodium tetrafluoroborate; ammonium tetrafluoroborate; tetramethylammonium hexafluorophosphate, hexafluoroantimonate or tetrafluoroborate; ($\eta^6$-toluene)tricarbonyl manganese hexafluorophosphate; ($\eta^6$-pyrene)($\eta^5$-cyclopentadienyl)iron (II) hexafluorophosphate; trimethylsulfoxonium tetrafluoroborate, hexafluorophosphate, or hexafluoroantimonate; 2,4,6-trimethylpyrylium perhclorate; or magnesium trifluoromethanesulfonate.

9. A method as claimed in claim 1 in which the epoxide resin is a cycloaliphatic epoxide resin, a polyglycidyl ether of a polyhydric alcohol or a polyhydric phenol, an advanced polyglycidyl ether of a polyhydric alcohol or polyhydric phenol, or a polyglycidyl ester of a polycarboxylic acid.

10. A method as claimed in claim 1 wherein there is used 0.1 to 10% by weight of the salt, based on the weight of the epoxide resin.

11. A method as claimed in claim 1 that is effected by mixing the epoxide resin with the salt in an organic or aqueous organic solvent, inserting a metallic surface as the anode and an inert metal as the cathode and passing a current until a suitable thickness of polymerised resin has been deposited on the anode.

12. A method as claimed in claim 11 in which the concentration of eposide resin in solution is from 5% to 50% by weight.

13. A method as claimed in claim 11 in which the solvent is a ketone, a halogenated hydrocarbon, a nitro compound or their mixtures.

14. A method as claimed in claim 11 that is effected at a temperature within the range 0° C. to 80° C.

15. A method as claimed in claim 1 in which the voltage used is from 15 to 150 V.

16. A metallic surface coated by a method as claimed in claim 1.

* * * * *